United States Patent [19]

McAllister et al.

[11] 4,054,334
[45] Oct. 18, 1977

[54] METHOD AND APPARATUS FOR INSTALLING A BEARING SHIELD OR SEAL INTO THE ANNULAR SPACE OF A BEARING

[75] Inventors: William D. McAllister, Poughkeepsie; Frank D. Rajczi, Hyde Park, both of N.Y.

[73] Assignee: Schatz Federal Bearings Co. Inc., Poughkeepsie, N.Y.

[21] Appl. No.: 664,964

[22] Filed: Mar. 8, 1976

[51] Int. Cl.² ............................................. F16C 33/76
[52] U.S. Cl. ............................. 308/187.1; 29/148.4 S; 277/92
[58] Field of Search ............... 308/187, 187.1, 187.2, 308/188, 78; 277/91, 94, 92, 93 R; 29/148.4 S

[56] References Cited

U.S. PATENT DOCUMENTS

| 3,752,243 | 8/1973 | Hummer et al. | 308/187.1 |
| 3,770,284 | 11/1963 | Galloway | 277/92 |
| 3,813,102 | 5/1974 | Derman | 308/187.1 |

Primary Examiner—Richard A. Bertsch
Attorney, Agent, or Firm—Hopgood, Calimafde, Kalil, Blaustein and Lieberman

[57] ABSTRACT

An antifriction bearing is provided having inner and outer bearing rings with a complement of rolling element held in the annular chamber therebetween, the annular chamber of said bearing being closed off by a plastic seal of durometer hardness over 50 and ranging up to about 100 deformably mounted therein by virtue of a flat plastic washer being placed in the annular chamber and radially extruded or deformed under pressure, with or without the application of heat, to effect radial flow of the periphery of said washer into a peripheral seal-retaining groove of one of said bearing rings in securing engagement therewith.

6 Claims, 11 Drawing Figures

METHOD AND APPARATUS FOR INSTALLING A BEARING SHIELD OR SEAL INTO THE ANNULAR SPACE OF A BEARING

This invention relates to a plastic bearing shield or seal and to a method and apparatus for installing said seal into the annular space of a bearing.

STATE OF THE ART

One of the common problems in bearing manufacture involves the securing of closures, shields, and/or seals in the seal-retaining ring grooves of annular bearings. For example, tool wear, size variations, and heat treating distortions of the peripheral groove of the annular raceways of the bearing contribute to this problem, thereby causing rejects of finished bearings and/or requiring reworking of the component parts of the bearing.

Many seals employed in antifriction bearings, as pointed out in U.S. Pat. No. 3,226,168, involve the use of relatively rigid members which, depending on their design, tend to have a braking or dampening effect upon the relative movement of the bearing components. An example of such a seal is a stiff molded plastic annular sealing disc, e.g. of nylon, held in position against rotating surfaces by a steel retaining ring or washer. The nylon seal of finished size is first snapped into position in the peripheral seal-retaining groove of one of the annular bearing members and a metal washer in the pre-cupped form (e.g. a conical shape) slipped into position next to the seal and then locked into place by flattening out the metal washer with an annular tool or punch inserted between the bearing members. The size of the washer must be sufficiently precise so that it will lock itself concentrically by expansion when it is flattened in binding relationship with the snapped-in seal member.

However, as stated earlier, slight distortions in the peripheral groove tend to make it difficult to secure adequate closure and sealing in the groove.

Thus, it would be desirable to provide a means of mounting a shield or seal made of rigid plastic material which will easily fill and lockingly engage and conform completely to the full circumference of the peripheral groove despite any residual distortion in the seal-retaining peripheral groove of the annular bearing ring.

OBJECTS OF THE INVENTION

It is thus the object of the invention to provide a novel method of mounting a non-metallic washer into the annular chamber of an annular bearing and provide a secure complete seal throughout the peripheral seal-retaining groove of an annular raceway element thereof.

Another object is to provide an improved antifriction bearing comprising an inner annular race ring concentrically located within an outer annular race ring with a complement of rolling elements mounted therebetween with a nonmetallic seal deformably mounted in the annular chamber on each side of said rolling elements.

These and other objects will more clearly appear from the following disclosure and the accompanying drawings, wherein.

STATEMENT OF THE INVENTION

One embodiment of the invention is directed to an anti-friction bearing comprising an inner annular race ring concentrically located within an outer annular race ring such as to define an annular chamber therebetween containing a complement of rolling elements, such as bearing balls, one of the race rings having a seal-retaining peripheral groove on each side thereof, the groove having a shoulder associated therewith, the other of said race rings having a land opposite each of said grooves in complementary relationship with each other. As will be appreciated by those skilled in the art, the land can have any contour. Completing the bearing is a non-metallic annular seal (e.g., plastic seal) deformably mounted in and substantially closing off said annular chamber on each side of said rolling elements with its circumference or periphery completely occupying the seal-retaining groove of said one race ring, said mounted annular seal in a selected cross section being characterized by a permanently deformed annular necked down portion adjacent to the groove.

Another embodiment of the invention is directed to a method of custom fitting a substantially flat non-metallic seal into the annular chamber of an antifriction bearing, the method comprising providing a flat deformable substantially rigid plastic washer in which the width of the annular thereof is less than the annular opening of the annular chamber but larger than the distance between the land of one of said bearing rings and shoulder of the peripheral seal-retaining groove of the other. The flat washer is dropped into the opening of the annular chamber so that it is supported by a shoulder of said peripheral groove and by said land and the washer then caused to flow radially into and in locking engagement with said peripheral groove by the application of deforming stresses with or without heat to said washer and cause it to deform and flow radially, thereby providing a bearing seal with its free end extending to the land of one of said bearing rings and with its circumferential portion deformed into a said peripheral groove in locking engagement therewith, said locked-in portion being characterized by an annular necked-down structure.

The plastic washer from which the seal is made may exhibit flow lines due to the flow lines in the calendered plastic sheet from which it is made. Thus, when the washer is deformed in place so that its circumferential portion flows into the peripheral groove of one of the bearing rings, any flow lines which may be present are compressed or crowded together at the necked-down portion after deforming the washer in place.

The non-metallic washer is preferably produced from a substantially rigid plastic sheet or strip, such as a plastic selected from the group consisting of nylon, acetal, polycarbonate, fluorocarbon, polyester and acrylic resins and other rigid plastic material having a durometer hardness of over about 50 and ranging up to about 100, e.g., 60 to 90.

Figure 1:
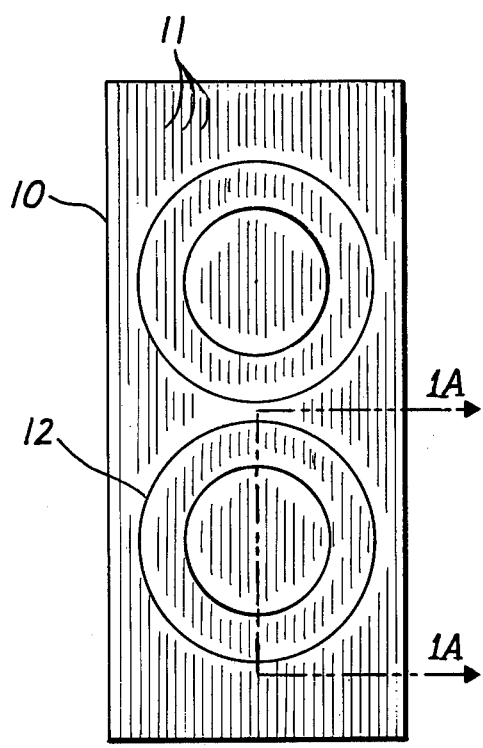
FIGS. 1, 1A, 2 and 2A depict washers cut from a calendered sheet of stiff plastic, e.g. nylon.
Figure 2:
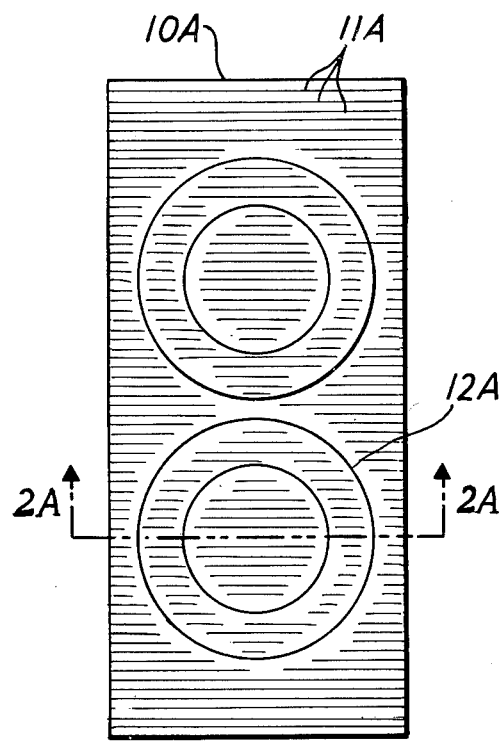

The plastic washer may be stamped out from a calendered sheet or strip 10 or 10A, shown in FIGS. 1 and 2. In FIG. 1, the calendered plastic sheet 10 is shown indicated with calendering flow lines 11 indicated as running longitudinally of said sheet; whereas, in FIG. 2, the flow lines 11A are indicated as running transverse of the sheet 10A shown.

Figure 1A:
Figure 2A:

In FIG. 1, the outline of a seal washer 12 is shown, the washer being shown in a selected cross section in FIG. 1A, with the flow lines 11 running across the washer as shown. Similarly, the outline of a washer 12A is shown in FIG. 2, with the flow lines 12A running across the washer as shown in a selected cross section of FIG. 2A. The flow lines are not always easily discernable under the microscope.

As stated earlier, the size of the annulus of the washer should be such that it can be dropped into the opening of the annular chamber of the antifriction bearing. This will be clearly apparent by referring to FIGS. 3 to 6A which depict sequentially the operational steps employed in custom fitting a bearing seal in situ into the annular space of the bearing.

Figure 3:
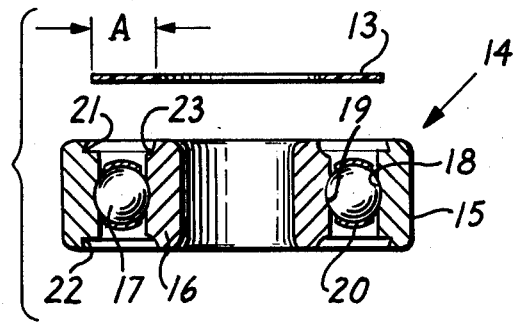
FIGS. 3 to 6A illustrate the sequential steps employed in the mounting of a substantially rigid plastic washer in the formation of a bearing seal in situ.

Thus, referring to FIG. 3, a seal washer 13 is shown disposed over an antifriction bearing 14, the width of the annulus A of the washer being smaller than the width of the annular space of the annular bearing but larger than the distance between the land of one of said bearing rings and a shoulder of the peripheral seal-retaining groove of the other, the outer diameter of the washer being less than the groove diameter of the bearing ring but greater than the diameter of the associated shoulder.

The antifriction bearing of FIG. 3 comprises an outer bearing ring 15 and an inner bearing ring 16 with a complement of rolling elements, e.g., bearing balls 17, held therebetween in races 18, 19 in the outer and inner bearing rings 15 and 16, respectively, the balls being held in place by cage 20.

The outer ring is characterized by a groove 21 with a shoulder 22 as shown, the inner ring having a land 23.

Figure 4:
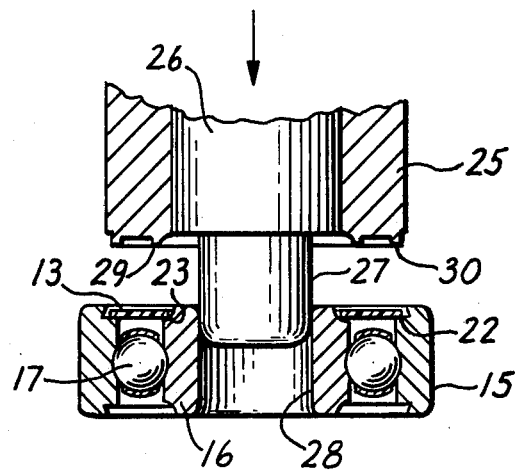
Figure 5:
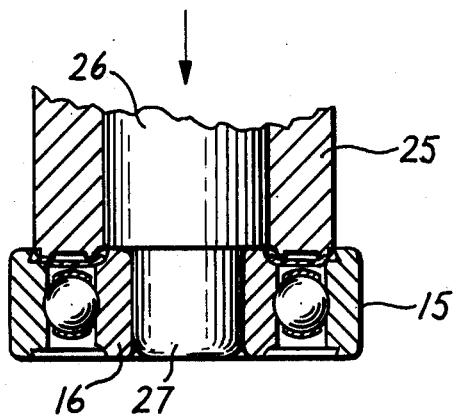

In FIG. 4, the seal washer 13 is shown placed into the annular space of the antifriction bearing on one side of the bearing elements, with the annulus of the washer supported by the shoulder 22 of the peripheral groove in the outer ring and the land 23 of the inner ring. Deforming stresses are applied at substantially right angles to the washer which may or may not be heated by using an annular punch 25 supported axially by an arbor 26 having a reduced end portion or pilot 27 extending from the hollow punch having a diameter slightly less than the inner diameter 28 of the inner ring but sufficient to slidingly and snugly center and engage said bearing ring opening. The bearing assembly is supported by well known means not shown. As stated hereinabove, the plastic washer may be heated depending upon its temperature stability. A temperature range of 100° to 150° F has been employed. Higher temperatures may be employed for certain resins, such as polycarbonate resins, for example, temperatures up to about 250° F or 350° F.

The face of the punch 25 has two annular ridges, an inner ridge 29 and an outer ridge 30, the diameter of the annular outer ridge corresponding to the shoulder 22 of the peripheral groove of bearing ring 15, while the diameter of the annular inner ridge 29 corresponds to the diameter of land 23 of the inner ring.

The punch is brought down so that the annular outer and inner ridges are caused to contact the washer above the support points corresponding to the shoulder of the peripheral groove and the land of the inner ring. Deforming pressure is applied against the flat washer whereby the washer is caused to flow radially into the seal-retaining groove and fill it substantially completely and secured in place while the free end of the washer extends to the land.

Figure 6:
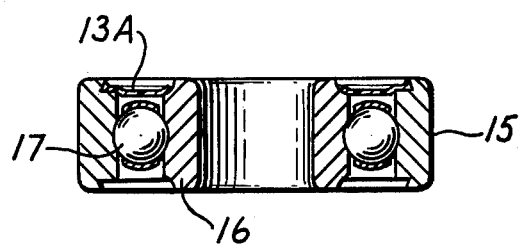
Figure 6A:
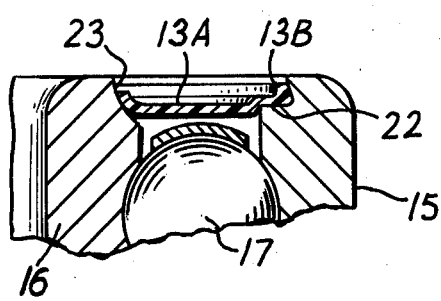

The custom-fitted seal is shown in FIG. 6 and more clearly in the expanded partial view of FIG. 6A. As will be noted, the outer circumference 13B of the resulting bearing seal fills out the groove to provide a slightly laterally offset bearing seal as shown secured in position despite any variation in the symmetry of the peripheral groove.

Figure 7:
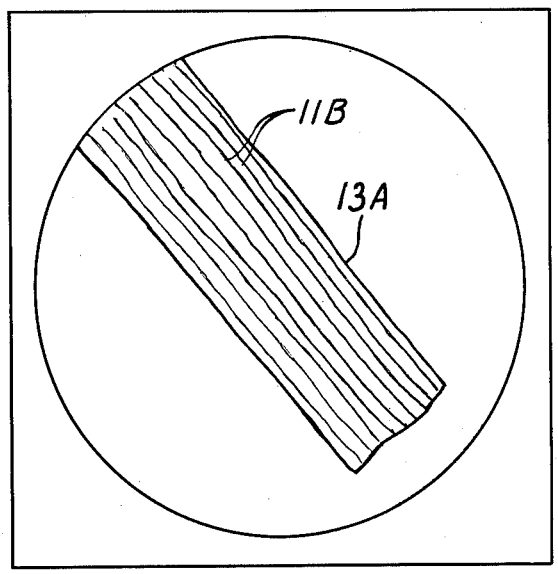
FIGS. 7 and 8 are cross-sectional representations of the mounted seal as viewed at 25 times magnification.
Figure 8:
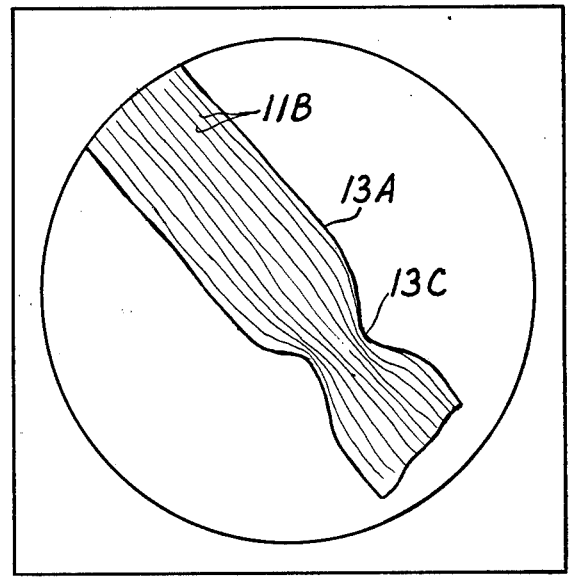

FIGS. 7 and 8 are representations of a selected cross section of the mounted seal, flow lines 11B being discernable along the free end of the seal 13A (FIG. 7) as viewed at 25 times magnification, the flow lines insofar as they are discernable being crowded or compressed together at the annular necked-down portion 13C of the seal (FIG. 8) by virtue of being radially deformed or extruded into the peripheral groove of the outer ring.

An advantage of the foregoing seal is that the portion of the seal indicated with an arrow in FIG. 8 is so formed that, when it is in the bearing and seated on the edge or shoulder of the outer groove, it causes the seal to maintain axial pressure against the land of the inner ring, thereby enhancing the seal's effectiveness. This feature, together with the fact that the seal is "custom fitted" to a specific bearing makes it more effective than those that are made independent of the bearing and which may have varying degrees of seal pressure and eccentricities that can adversely affect sealing efficiency.

The term "plastic" used herein is meant to include plastic containing known filler materials, such as glass or synthetic fibers, molybdenum disulfide, and the like.

Examples of industrial nylon plastics are those sold under the trademarks Nylatron GS, Nylatron GSM, and the like. The Nylatron plastic has a tensile strength of about 10,000 to 14,000 psi at 73° F, a modulus of elasticity of about 350,000 to 600,000 psi (73° F) and a durometer hardness of about 80 to 90.

Polycarbonate exhibits a tensile strength of about 9000 to 10,500 (73° F), a modulus of elasticity of about 320,000 psi (73° F) and a durometer hardness of about 80 to 85.

The fluorocarbon polytetrafluoroethylene has a modulus of elasticity of about 50,000 to 90,000 psi (73° F) and exhibits a durometer hardness of about 55 to 70. Sintered polytetrafluoroethylene is stiffer and more rigid and exhibits a modulus of elasticity of 150,000 to 250,000 psi (73° F) and has a durometer hardness of about 65 to 75.

The acetal resin known by the trademark Delrin exhibits a modulus of elasticity of 360,000 to 500,000 and is quite rigid.

According to the literature, the properties of the foregoing plastics are derived from ASTM Test Methods D-638, D-790, D-785 and D-676.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. An antifriction bearing comprising an inner annular race ring concentrically located within an outer annular race ring such as to define an annular chamber therebetween containing a complement of rolling elements, one of said race rings having a peripheral groove spaced on each side thereof, the other of said race rings having a land opposite each of said peripheral grooves, and a substantially rigid plastic annular seal deformably mounted in the annular chamber on each side of said rolling elements with the periphery of said seal radially deformed into said peripheral groove and substantially filling the space therein, said plastic seal having a durometer hardness of over 50 and ranging up to about 100, said annular seal in a selected cross section being characterized by a permanently deformed annular neck adjacent to the peripheral groove.

2. The antifriction bearing of claim 1, wherein the plastic seal has a durometer hardness of about 60 to 90.

3. The antifriction bearing of claim 2, wherein the plastic is selected from the group consisting of nylon, acetal, polycarbonate, fluorocarbon, polyester and acrylic resins.

4. The antifriction bearing of claim 3, wherein a selected cross section of the plastic seal exhibits flow lines running along said cross section and wherein the flow lines in the permanently deformed annular neck of the seal adjacent the peripheral groove are crowded together compared to the flow lines running along said selected cross section.

5. An antifriction bearing comprising an inner annular race ring concentrically located within an outer annular race ring such as to define an annular chamber therebetween containing a complement of rolling elements, one of said race rings having a peripheral groove spaced on each side thereof, the other of said race rings having a land opposite each of said peripheral grooves, and a substantially rigid plastic annular seal of durometer hardness over 50 and ranging up to about 100 deformably mounted in the annular chamber on each side of said rolling elements with the periphery of said seal radially deformed into said peripheral groove and filling the space therein, said annular seal in a selected cross section being characterized by a permanently deformed annular neck adjacent to the peripheral groove, said annular seal in said cross section exhibiting flow lines running along said cross section, the flow lines in the permanently deformed annular neck being crowded together compared to the flow lines outside said neck.

6. The antifriction bearing of claim 5, wherein the plastic of the seal is selected from the group consisting of nylon, acetal, polycarbonate, fluorocarbon, polyester and acrylic resins, and wherein said plastic has a durometer hardness of about 60 to 90.

* * * * *